US012772076B2

(12) United States Patent
Muhammad et al.

(10) Patent No.: US 12,772,076 B2
(45) Date of Patent: Oct. 20, 2026

(54) NCR MANAGEMENT

(71) Applicant: RAKUTEN MOBILE, INC., Tokyo (JP)

(72) Inventors: Awn Muhammad, Tokyo (JP); Koichiro Kitagawa, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 300 days.

(21) Appl. No.: 18/566,229

(22) PCT Filed: Nov. 3, 2023

(86) PCT No.: PCT/US2023/036742
§ 371 (c)(1),
(2) Date: Dec. 1, 2023

(87) PCT Pub. No.: WO2024/097383
PCT Pub. Date: May 10, 2024

(65) Prior Publication Data

US 2025/0119764 A1 Apr. 10, 2025

Related U.S. Application Data

(60) Provisional application No. 63/382,293, filed on Nov. 3, 2022.

(51) Int. Cl.
*H04W 24/02* (2009.01)

(52) U.S. Cl.
CPC .................................. *H04W 24/02* (2013.01)

(58) Field of Classification Search
CPC .................................................... H04W 24/02
See application file for complete search history.

(56) References Cited

U.S. PATENT DOCUMENTS

| | | | | |
|---|---|---|---|---|
| 2007/0194942 A1* | 8/2007 | Darr | H02H 3/042 340/635 |
| 2024/0040591 A1* | 2/2024 | Babaei | H04W 72/25 |

FOREIGN PATENT DOCUMENTS

| | | | |
|---|---|---|---|
| CN | 214480607 U * | 10/2021 | |
| WO | WO-2023197095 A1 * | 10/2023 | H04W 52/367 |
| WO | WO-2024065537 A1 * | 4/2024 | H04L 27/00 |

OTHER PUBLICATIONS

ZTE Corporation, et al., "Consideration on NCR signalling and RRM functions", 3GPP TSG-RAN WG2 Meeting #119bis-e, R2-2210295, Online, Oct. 10-19, 2022 (5 pages total).

Nokia, et al., "Discussion on side control information to enable NR network-controlled repeaters", 3GPP TSG RAN WG1 #110, R1-2205939, Toulouse, France, Aug. 22-26, 2022 (7 pages total).

* cited by examiner

*Primary Examiner* — Samina F Choudhry
(74) *Attorney, Agent, or Firm* — Sughrue Mion, PLLC

(57) ABSTRACT

A method of network-controlled repeater (NCR) management includes obtaining, by an NCR, operations, administrations, and management (OAM) information, generating, by the NCR, NCR assistance information based on the OAM information, transmitting, by the NCR to a base station, the NCR assistance information and performing, by the base station, a corrective action on the NCR based on the NCR assistance information.

20 Claims, 5 Drawing Sheets

NCR MANAGEMENT

CROSS-REFERENCE TO RELATED APPLICATION(S)

This application is a National Stage of International Application No. PCT/US2023/036742 filed Nov. 3, 2023, claiming priority based on U.S. Provisional Application No. 63/382,293, filed on Nov. 3, 2022 in the United States Patent and Trademark Office, the disclosure of which is incorporated herein by reference in its entirety.

1. FIELD

Apparatuses and methods consistent with example embodiments of the present disclosure relate to systems and methods for network-controlled repeater (NCR) management.

2. DESCRIPTION OF RELATED ART

In related art, certain aspects of NCR operations, administration and maintenance (OAM), such as switching on/off of the forward link and beam control related procedures are discussed that would be controlled through radio resource control (RRC) indications. However, no alarm reporting or location reporting procedures for the NCR are currently available.

SUMMARY

According to embodiments, systems and methods are provided for network-controlled repeater (NCR) management where NCR assistance information is generated and provided, such that the NCR may be monitored and actions may be performed to improve the performance of the NCR and overall operations of the systems and methods.

According to an example embodiment of the disclosure, a method of NCR management may include obtaining, by an NCR, operations, administrations, and management (OAM) information, generating, by the NCR, NCR assistance information based on the OAM information, transmitting, by the NCR to a base station, the NCR assistance information and performing, by the base station, a corrective action on the NCR based on the NCR assistance information.

According to an example embodiment of the disclosure, a system for NCR management is configured to obtain, by an NCR, OAM information, generate, by the NCR, NCR assistance information based on the OAM information, transmit, by the NCR to a base station, the NCR assistance information, and perform a corrective action on the NCR based on the NCR assistance information.

According to an example embodiment of the disclosure, an NCR is configured to obtain OAM information, generate NCR assistance information based on the OAM information and transmit, to a base station, the NCR assistance information, where a corrective action on the NCR may be performed based on the NCR assistance information.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
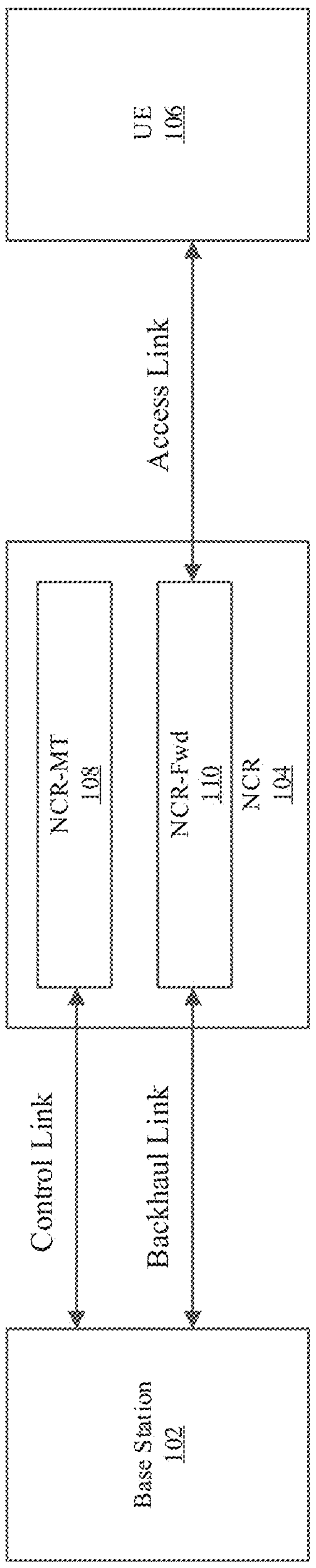
FIG. 1 is a diagram of a wireless environment including a network-controlled receiver (NCR), according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and

[B]" or "at least one of [A] or [B]" are to be understood as including only A, only B, or both A and B.

Example embodiments of the present disclosure provide a method and system in which a network-controlled receiver is managed. The system of NCR management may obtain, by the NCR, operations, administrations, and management (OAM) information, generate, by the NCR, NCR assistance information based on the OAM information, transmit, by the NCR to a base station, the NCR assistance information, and perform, by the base station, a corrective action on the NCR based on the NCR assistance information. The OAM information may include temperature information of the NCR, overheating information of the NCR, location information of the NCR, and user equipment (UE) assistance information (UAI) corresponding to a UE. The system may obtain the UAI via an access link between the UE and an NCR mobile forwarding function module (NCR-Fwd) of the NCR. The NCR assistance information may include an alarm indicating an overheating status of the NCR, and an alarm indicating a change of location of the NCR. The system may transmit the NCR assistance information from an NCR mobile termination function module (NCR-MT) of the NCR to the base station via a control link. The system may transmit the NCR assistance information from the NCR-Fwd to the base station via a backhaul link. The system may transmit the NCR assistance information repeatedly at predetermined time intervals.

By providing NCR assistance information, such as heating information, location information, etc., the system may provide consistent or semi-constant monitoring of the NCR status and may perform actions on the NCR more efficiently, improving the overall performance of the wireless network system.

FIG. 1 is a diagram of a wireless environment including an NCR, according to an embodiment. As shown in FIG. 1, the wireless environment may include a base station (e.g., a gNB) 102, an NCR 104, and a UE 106. The NCR 104 may include an NCR-MT 108 and an NCR-Fwd 110. A control link may be provided between the base station 102 and the NCR-MT 108, a backhaul link may be provided between the base station 102 and the NCR-Fwd 110, and an access link may be provided between the NCR-Fwd 110 and the UE 106.

The NCR-MT 108 may be defined as a function entity to communicate with the base station 102 via the control link (e.g., C-link) to enable exchange of control information (e.g., side control information at least for the control of the NCR-Fwd 110). The control link may be based on a new radio (NR) Uu interface. The NCR-Fwd 110 may be defined as a function entity to perform the amplify-and-forwarding of uplink (UL)/downlink (DL) radio frequency (RF) signal between the base station 102 and the UE 106 via the backhaul link and access link. The behavior of the NCR-Fwd 110 may be controlled according to the received side control information from the base station 102.

For the NCR 104, the control link may be established for control and authorization purposes, and may also be utilized to provide OAM (or operation and maintenance (O&M)) functionalities. The NCR 104 may be a network node and not a user device. Thus, it is desirable to have OAM related functionalities supported for the NCR 104. The NCR 104 may be configured to report alarms for monitoring purposes, such than an operator has visibility and control over the NCR 104.

The NCR 104 may be configured to provide NCR assistance information, such as temperature information, overheating information, location information, etc. The NCR 104 may be configured to provide NCR assistance information via the control link to the base station 102 when the NCR assistance information corresponds to the NCR-MT 108, where the NCR assistance information may include temperature information, overheating information, location information, etc., of the NCR-MT 108. The NCR 104 may be configured to provide NCR assistance information via the backhaul link to the base station 102 when the NCR assistance information corresponds to the NCR-Fwd 110, where the NCR assistance information may include temperature information, overheating information, location information, etc., of the NCR-Fwd 110.

Furthermore, the NCR 104 may be configured to enhance UEs with UE assistance information (UAI) to support separate UE overheating. That is, the NCR 104 may be configured send UAI to the base station 102. The system may utilize the NCR-MT 108 to report the UAI to the base station 102 via the control link, and may utilize the NCR-Fwd 110 to report the UAI to the base station 102 via the backhaul link. The UAI may include information and feedback, such as overheating mitigation, measurement, power saving information, etc., to reduce the physical resource blocks (PRBs) allocated to the UE 106, while also allowing the UE 106 to disable various components (e.g., reducing layers). Put alternatively, the NCR assistance information may include the UAI.

The NCR 104 may also be configured to provide location information of the NCR 104. That is, the NCR assistance information may include location information of the NCR 104. For example, location information may be beneficial when the NCR 104 is a high powered receiver, and the location of the NCR 104 is changed (e.g., the receiver is stolen or the position is inadvertently adjusted), there may be electromagnetic interference issues such as exposure issues to humans, and/or signal interferences caused by the change in position (i.e., even if a location change is within an authorized base station). Thus, the NCR 104 may be configured to include location information in the NCR assistance information. The NCR 104 may be configured to optionally include location information in the NCR assistance information. The NCR 104 may be configured to mandatorily include location information in the NCR assistance information (i.e., the NCR 104 may be configured to operate similar to a normal UE but with different capabilities).

In operation, the NCR 104 may be configured to obtain OAM information. The OAM information may include temperature information of the NCR 104, overheating status of the NCR 104, information regarding the UE 106, location information of the NCR 104, etc., as is described above. Based on the detected OAM information, the NCR 104 may be configured to generate NCR assistance information. The NCR assistance information may be information in a format that is readable/identifiable by a translating side, such as a base station 102, a UE 106, other wireless systems, etc. Based on the system configuration, the NCR assistance information may be the detected OAM information or may be further information (e.g., formatted OAM information, alerts generated based on the OAM information, such as an overheating alert, a location change alert, etc.).

The NCR 104 may be configured to transmit the NCR assistance information. For example, the NCR-MT 108 may be configured to transmit the NCR assistance information to the base station 102 via the control link. The NCR-Fwd 110 may be configured to transmit the NCR assistance information to the base station 102 via the backhaul link, and configured to transmit the NCR assistance information to the UE 106 via the access link. Furthermore, the UE 106 may be configured to transmit UAI to the NCR-Fwd 110 via the access link, and the NCR 104 may be configured to generate NCR assistance information based on the UAI. The NCR 104 may be configured to transmit the NCR assistance information a predetermined intervals, and/or configured to transmit NCR assistance information when detecting an alarm based on the OAM information.

In response to receiving the NCR assistance information, the base station 102 and/or the UE 106 may be configured to perform a corrective action on the NCR 104 and/or the UE 106 based on the NCR assistance information. For example, if the base station 102 detects that the NCR 104 location is changed, then the base station 102 may disable the NCR 104 through OAM information or utilizing an air-interface. Alternatively, if the NCR 104 indicates (i.e., reports) that the temperature has increased or provides some other alarm, the base station 102 may reduce or terminate transmission to the NCR 104 temporarily or shift traffic to other frequency bands.

Figure 2:
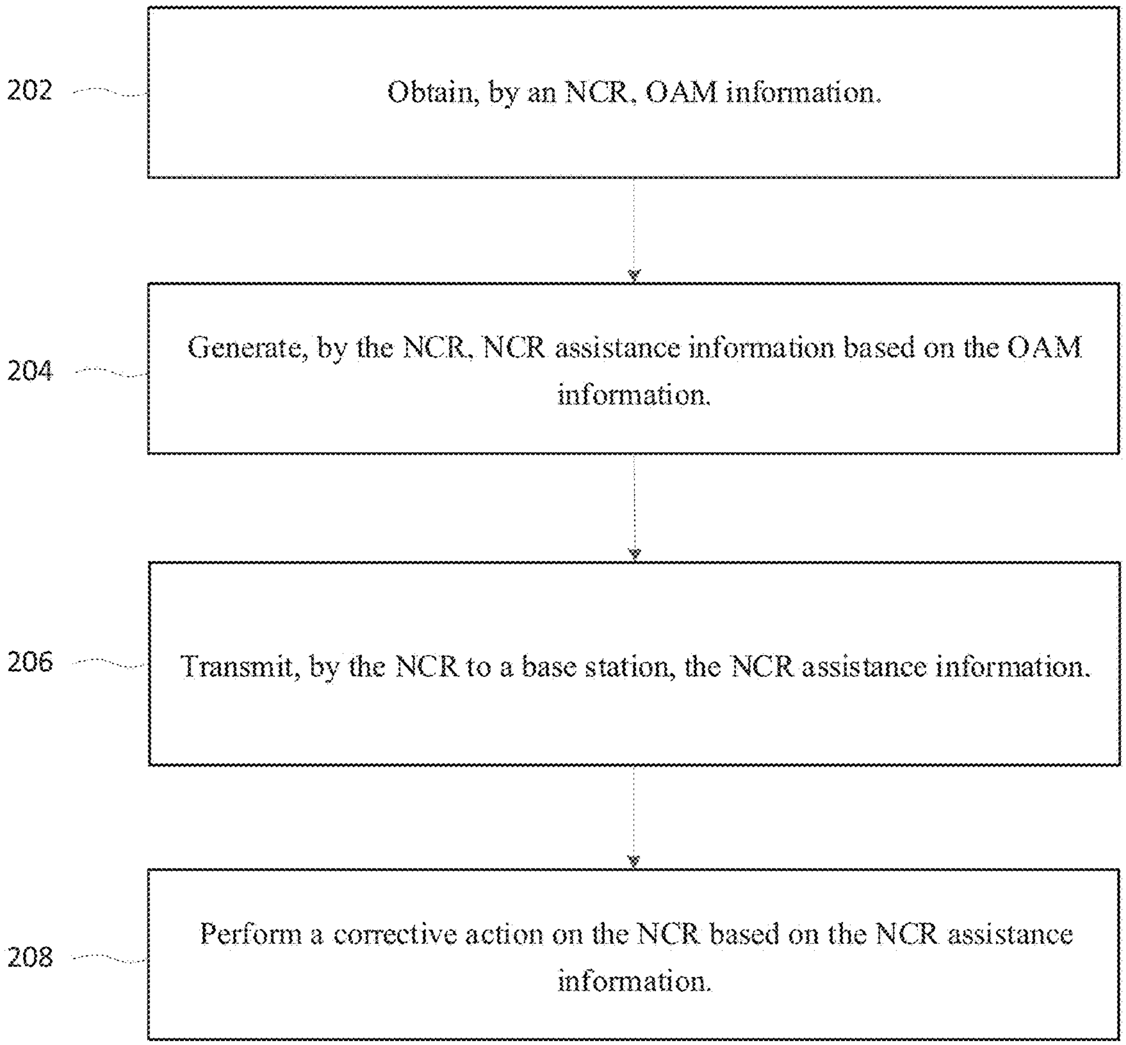
FIG. 2 is a flowchart of a method of NCR management, according to an embodiment.

FIG. 2 is a flowchart of a method of NCR management, according to an embodiment. In operation 202, the system may obtain, by the NCR, OAM information. In operation 204, the system may generate, by the NCR, NCR assistance information based on the OAM information. In operation 206, the system may transmit, by the NCR to a base station, the NCR assistance information. In operation 208, the system may perform a corrective action on the NCR based on the NCR assistance information. The corrective action may be performed by the base station, the NCR, the UE, and/or another device in communication with the wireless environment.

By providing the NCR assistance information, an operator may be able to perform consistent or semi-constant monitoring of the NCR status and may perform actions on the NCR more efficiently, improving the overall performance of the wireless network system.

Figure 3:
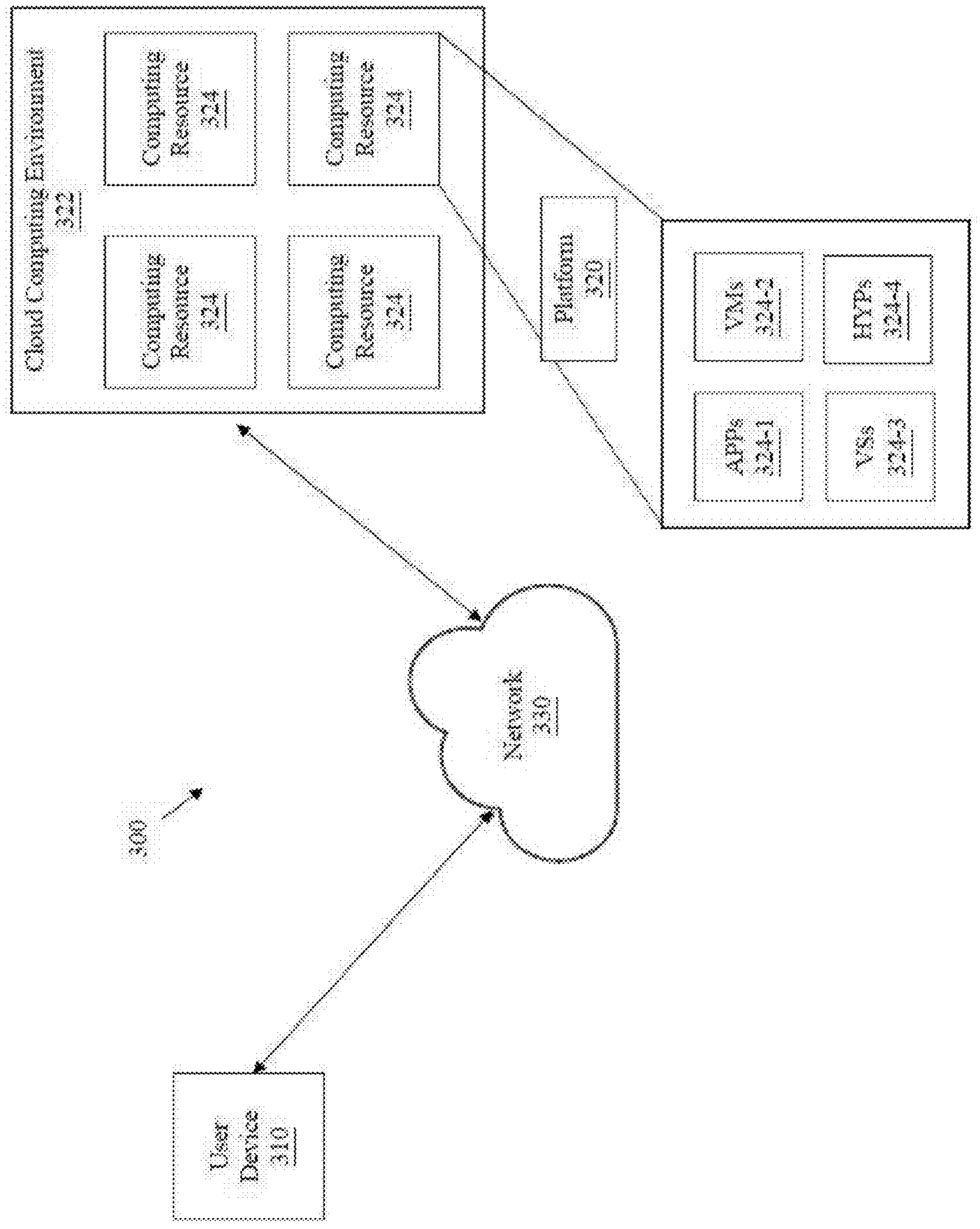
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include a user device 310, a platform 320, and a network 330. Devices of environment 300 may interconnect via wired connections, wireless connections, or a combination of wired and wireless connections. In embodiments, any of the functions and operations described with reference to FIG. 1 above may be performed by any combination of elements illustrated in FIG. 3.

User device 310 includes one or more devices capable of receiving, generating, storing, processing, and/or providing information associated with platform 320. For example, user device 310 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 310 may receive information from and/or transmit information to platform 320.

Platform 320 includes one or more devices capable of receiving, generating, storing, processing, and/or providing information. In some implementations, platform 320 may include a cloud server or a group of cloud servers. In some implementations, platform 320 may be designed to be modular such that certain software components may be swapped in or out depending on a particular need. As such, platform 320 may be easily and/or quickly reconfigured for different uses.

In some implementations, as shown, platform 320 may be hosted in cloud computing environment 322. Notably, while implementations described herein describe platform 320 as being hosted in cloud computing environment 322, in some implementations, platform 320 may not be cloud-based (i.e., may be implemented outside of a cloud computing environment) or may be partially cloud-based.

Cloud computing environment 322 includes an environment that hosts platform 320. Cloud computing environment 322 may provide computation, software, data access, storage, etc. services that do not require end-user (e.g., user device 310) knowledge of a physical location and configuration of system(s) and/or device(s) that hosts platform 320. As shown, cloud computing environment 322 may include a group of computing resources 324 (referred to collectively as "computing resources 324" and individually as "computing resource 324").

Computing resource 324 includes one or more personal computers, a cluster of computing devices, workstation computers, server devices, or other types of computation and/or communication devices. In some implementations, computing resource 324 may host platform 320. The cloud resources may include compute instances executing in computing resource 324, storage devices provided in computing resource 324, data transfer devices provided by computing resource 324, etc. In some implementations, computing resource 324 may communicate with other computing resources 324 via wired connections, wireless connections, or a combination of wired and wireless connections.

As further shown in FIG. 3, computing resource 324 includes a group of cloud resources, such as one or more applications ("APPs") 324-1, one or more virtual machines ("VMs") 324-2, virtualized storage ("VSs") 324-3, one or more hypervisors ("HYPs") 324-4, or the like.

Application 324-1 includes one or more software applications that may be provided to or accessed by user device 310. Application 324-1 may eliminate a need to install and execute the software applications on user device 310. For example, application 324-1 may include software associated with platform 320 and/or any other software capable of being provided via cloud computing environment 322. In some implementations, one application 324-1 may send/receive information to/from one or more other applications 324-1, via virtual machine 324-2.

Virtual machine 324-2 includes a software implementation of a machine (e.g., a computer) that executes programs like a physical machine. Virtual machine 324-2 may be either a system virtual machine or a process virtual machine, depending upon use and degree of correspondence to any real machine by virtual machine 324-2. A system virtual machine may provide a complete system platform that supports execution of a complete operating system ("OS"). A process virtual machine may execute a single program, and may support a single process. In some implementations, virtual machine 324-2 may execute on behalf of a user (e.g., user device 310), and may manage infrastructure of cloud computing environment 322, such as data management, synchronization, or long-duration data transfers.

Virtualized storage 324-3 includes one or more storage systems and/or one or more devices that use virtualization techniques within the storage systems or devices of computing resource 324. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 324-4 may provide hardware virtualization techniques that allow multiple operating systems (e.g., "guest operating systems") to execute concurrently on a host computer, such as computing resource 324. Hypervisor 324-4 may present a virtual operating platform to the guest operating systems, and may manage the execution of the guest operating systems. Multiple instances of a variety of operating systems may share virtualized hardware resources.

Network 330 includes one or more wired and/or wireless networks. For example, network 330 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
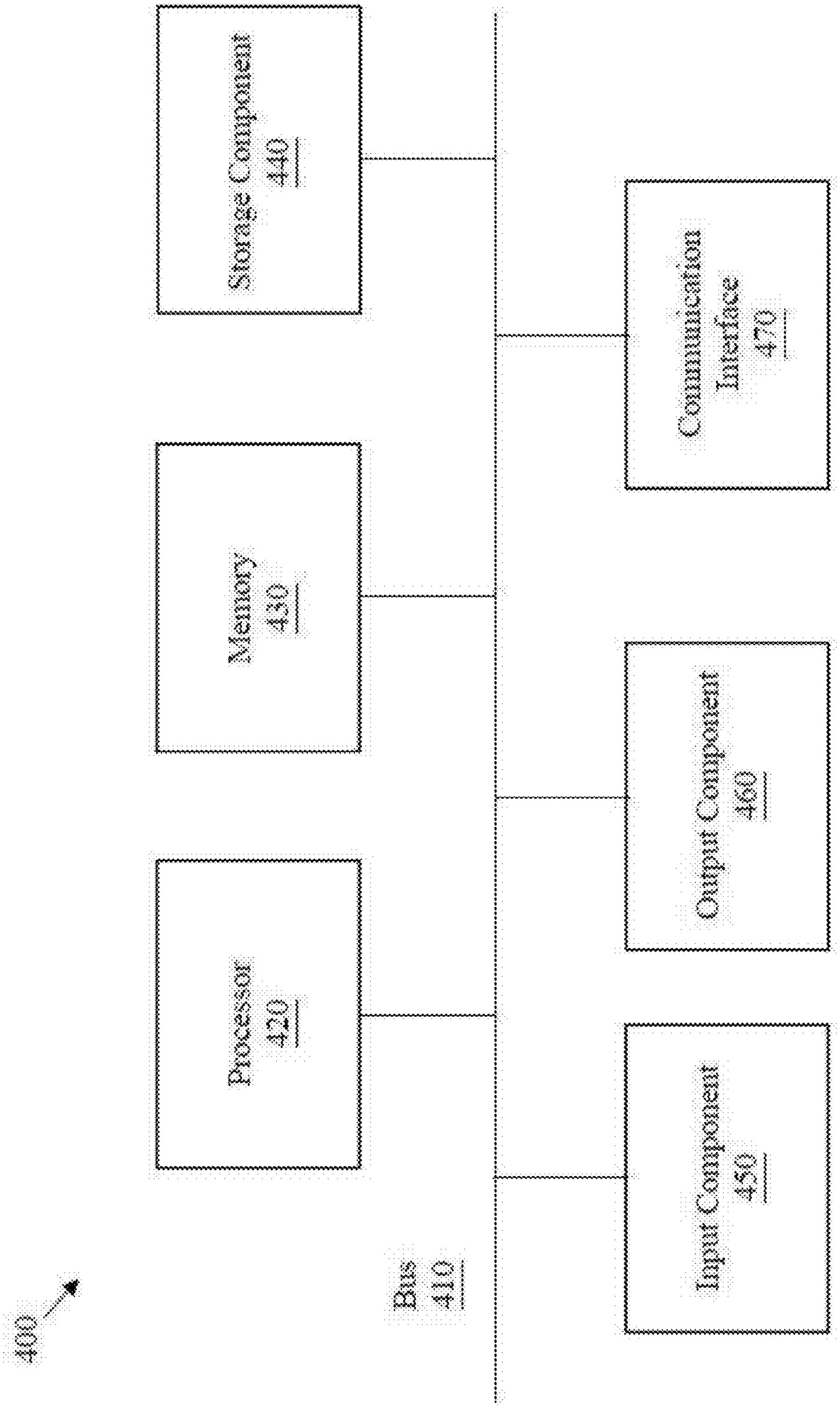
FIG. 4 is a diagram of example components of a device according to an embodiment.

FIG. 4 is a diagram of example components of a device 400. Device 400 may correspond to user device 310 and/or platform 320. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 may be implemented in hardware, firmware, or a combination of hardware and software. Processor 420 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

In embodiments, any one of the operations or processes of FIGS. 1 and 2 may be implemented by or using any one of the elements illustrated in FIGS. 3 and 4.

With reference to 3$^{rd}$ generation partnership project technical report (3GPP TR) 38.867 (incorporated by reference herein), agreements from RAN2 119bis-e include the following: RAN2 confirms to use RRC signaling to configure NCR-MT to receive side control information. How the side control information itself is transmitted (i.e. via RRC or downlink control information (DCI) or medium access control (MAC) channel estimation (CE)) is up to RAN1 (RAN2 may discuss the initial RAN1 decision and revisit if needed); NCR-MT supports RRC_CONNECTED and RRC_IDLE states, FFS on RRC_INACTIVE state (e.g., optional support or non-support); NCR-MT supports SRB0/1/2, data radio bearer (DRB) is optional and FFS is on a maximum number of DRBs; radio resource management (RRM) functions supported by NCR-MR include mandatory cell selection, as well as cell reselection, radio link monitoring (RLM), bidirectional forwarding detection (BFD), beam failure recovery (BFR) are FFS.

The SA3 liaison statement (LS) reply to RAN2, RAN3 includes the following: SA3 has further discussion on the questions from RAN3 and would like to share the views as follows: To SA3 Q1a: Is there any security issue for Solution 2 which does not provide Uu security, non-protected NCR indication info and the OAM container in Step 5? Answer to RAN3: Yes. For Solution 2, SA3 believes that this information can be tampered due to the lack of Uu security. It exposes the OAM indirectly to attacks over the air interface. To SA3 Q1b: Does SA3 believe that the NCR needs to be securely validated? Is there any security issue for configuring locally stored information in the gNB in Solution 1? Answer to RAN3: For the 1st question in Q1b, SA3 is not clear about what "validation" means, and for the 2nd question in Q1b, SA3 cannot provide answers before the security validation related steps in Solution 1 are clarified. In addition, the feasibility of such additional steps and what kind of information is stored in RAN are also unclear. Further clarification is expected.

The following agreements were made during the last RAN3_117bis-e: the NCR authorization indicator is provided from access and mobility management function (AMF) to gNB explicitly over the next generation (NG) interface; the discussion on RAN impact on validation function is pending to the SA3 reply LS; gNB-centralized unit (CU) knows whether the connected gNB-distributed unit (DU) supports NCR based on OAM configuration; down selection on all solutions, which takes the feedback from SA3 and SA5 into account, can be discussed in next RAN3 meeting; and the NCR-OAM connectivity requirement should be supported, further details can be discussed.

Accordingly, example embodiments of the disclosure may be directed to management aspects of NCR, such as identification, validation, and authorization of NCR (including SA3-LS reply), as well as motivation for NCR support for OAM.

Figure 5:
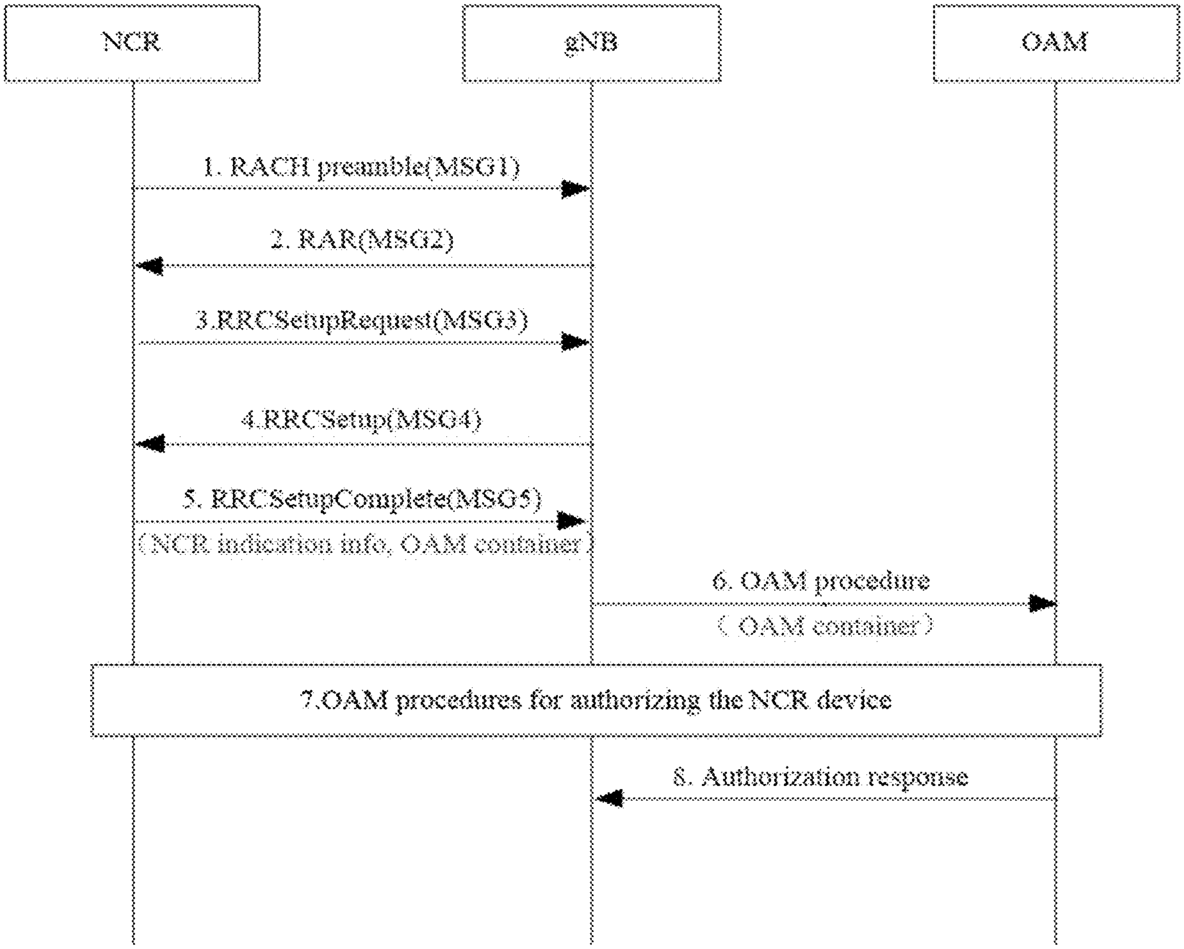
FIG. 5 is a flow diagram of a method according to an embodiment.

FIG. 5 is a flow diagram. That is, FIG. 5 is a call flow diagram corresponding to Solution 2 of TR 38.867. As per SA3 (S3-223080), one issue with Solution 2 (OAM based solution) is a lack of universal mobile telecommunications system (UMTS) air interface (Uu) security as it exposes the OAM indirectly to attacks over the air interface. In a first observation, based on SA3 reply, RAN work groups (WGs) have the following ways forward regarding Solution 2 (OAM Based solution): investigate new provisions for NCR Uu security such as an NCR authorization indicator provided from AMF to gNB explicitly over the NG interface, as agreed in RAN3 117bis-e; or discard an OAM based solution for authorization of NCR. Due to new requirements that may have specifications impact, example embodiments may include discarding Option 2 (i.e., discard an OAM based solution for authorization of NCR) based on SA3 LS Reply. In particular, example embodiments may include discarding the OAM based Solution 2, to avoid any security risk or unnecessary new specification requirements. Example embodiments may include that RAN WGs pursue Solution 4 (integrated access/backhaul (IAB)-like authentication) due to similarities between the NCR and the IAB.

In a second observation, from the LS Reply from SA3, it is mentioned that the meaning of "validation" is not clear. That is, "SA3 is not clear about what 'validation' means" as it is not mentioned in Solution 2 of TR38.867. However, Solution 1 in the same TR states the meaning of validation as follows: "If required, NCR validation is used to further check the validity of NCR, the details can be further discussed in normative phase. After AS security is established between the gNB and the NCR device, the NCR sends NCR credential information for NCR validation to the gNB via RRC message (e.g. UE Assistance Information). The NCR credential information are pre-allocated by the operator. After receiving the NCR credential information, the gNB validates the NCR device by checking its local stored information." However, the above definition provided in Solution 1 does not fully capture the intention of validation.

As per a previous discussion, RAN would like to ensure not only that the NCR is authorized by AMF/OAM but also is connected to an intended cell/gNB and not deployed in the non-intended area (which can cause interference or other issues). Thus, example embodiments may include RAN2 informing SA3 that validation means not only that NCR is "authorized" to be connected to the network but also is connected to a valid cell/gNB in an appropriate area.

In a third observation, RAN3 have agreed that NCR authorization is provided from the AMF to the gNB explicitly over the NG interface. That is, RAN3 is converging to Solution 3 and Solution 4 provided in TR 38.867. Thus, example embodiments may include selecting Solution 3 due to similarities between the IAB node and the NCR.

In a fourth observation, Solution 3 provided in TR 38.867 includes a clause on further authorization, which may represent the validation part. That is, according to TR 38.867 Solution 3: during NG control plane interface (NG-C) setup procedure, the AMF should inform the gNB whether it supports NCR, e.g. by including an "NCR-supported" indicator in NG SETUP RESPONSE message; NCR establishes the RRC connection and the NCR identification can be implemented by reporting an NCR indicator in Msg5 (in addition to sending any NCR-related radio capability) and/or by reporting an NCR indicator (implicitly or explicitly) in UE's radio capability signaling; the gNB selects an AMF which supports the NCR function, and forwards the NCR indicator to the AMF; and the AMF and other core network (CN) entities do further authorization, and provide "NCR authorized" to the gNB. Thus, in example embodiments, the validation part of NCR may be included in the "further authorization" procedure described in Solution 3.

In a fifth observation, RAN3 made the following agreement during RAN3 bis117e: "The NCR-OAM connectivity requirement should be supported, further details can be discussed." Certain aspects of OAM such as switching ON/OFF of a forward link and beam control related procedures are discussed in RAN1 that would be controlled through RRC indications. However, a few aspects related to OAM are not yet covered by TR 38.867 and not discussed in RAN WGs. While an NCR repeater works on L1 repetition from a backhaul to forward link, C-link is also established for control and authorization purpose. Thus, the same C-Link can also be utilized to provide OAM related functionalities. As the NCR is a network node and not a user device, operators would like to have OAM related functionalities supported for NCR. Thus, critical functionalities that are required for NCR may include alarms reporting and location information reporting.

Regarding alarms reporting, the NCR would be required to report alarms for monitoring purposes, without such functionality Operator will not have visibility and control over repeater. Apart from basic alarms such as equipment malfunction, software (SW)/hardware (HW) component failure, voltage/current, etc. Therefore, example embodiments have functionality for reporting of the NCR temperature or overheating assistance information. In particular, according to example embodiments, as RAN3 have already agreed on OAM connectivity requirements, RAN2 may provide the framework for OAM related functionalities like alarm reporting for NCR. Furthermore, according to example embodiments, the RAN2 provides enhancements for UAI to support separate UAI overheating assistance information for C-Link, NCR-MT and NCR-forwarding for NCR.

Regarding location information reporting, although the validation/authorization part of Solution 3 would cover that the NCR is only installed under coverage of intended cell or gNB, if the NCR is misplaced and later installed at a location which is not intended, it may cause interference or electromagnetic field (EMF) exposure related issues (for high power repeaters). Thus, in example embodiments, the NCR repeater supports location reporting, whether it would be an optional capability or mandatory capability may be an additional consideration. In example embodiments, the NCR supports location information reporting to avoid interference and other issues even within authorized cell/gNB.

Embodiments may include discarding OAM-based solutions to avoid security risks or unnecessary new specification requirements. Embodiments may include a RAN WG solution for IAB-like authentication due to similarities between NCR and IAB. In some embodiments, validation may indicate not only that the NCR is "authorized" to be connected to a network but also is connected to a valid cell/base station in appropriate areas. Embodiments may select Solution 3 of TR 38.867 due to similarities between the IAB node and NCR. Embodiments may include the validation part of the NCR in the "further authorization" procedure of Solution 3 of TR 38.867. Furthermore, as RAN3 has already agreed on OAM connectivity requirements, RAN2 may provide the framework for OAM related functionalities such as alarm reporting for the NCR. RAN2 may provide enhancements for the UAI to support separate UAI overheating assistance information for C-Link, NCR-MR and NCR-forwarding for NCR. The NCR may support location information reporting to avoid interference and other issues, even within authorized cells/base stations.

According to an aspect of the disclosure, a method of NCR management may include obtaining, by an NCR, OAM information, generating, by the NCR, NCR assistance information based on the OAM information, transmitting, by the NCR to a base station, the NCR assistance information and performing, by the base station, a corrective action on the NCR based on the NCR assistance information.

The OAM information may include at least one of temperature information of the NCR, overheating information of the NCR, location information of the NCR, and UAI corresponding to a UE.

Obtaining the OAM information may include obtaining the UAI via an access link between the UE and an NCR-Fwd of the NCR.

The NCR assistance information may include at least one of an alarm indicating an overheating status of the NCR, and an alarm indicating a change of location of the NCR.

The transmitting the NCR assistance information may include transmitting the NCR assistance information from an NCR-MT of the NCR to the base station via a control link.

The transmitting the NCR assistance information may include transmitting the NCR assistance information from an NCR-Fwd of the NCR to the base station via a backhaul link.

The transmitting the NCR assistance information may be performed repeatedly at pre-determined time intervals.

According to an aspect of the disclosure, a system for NCR management may be configured to obtain, by an NCR, OAM information, generate, by the NCR, NCR assistance information based on the OAM information, transmit, by the NCR to a base station, the NCR assistance information, and perform a corrective action on the NCR based on the NCR assistance information.

The OAM information may include at least one of temperature information of the NCR, overheating information of the NCR, location information of the NCR, and UAI corresponding to a UE.

The system may be configured to obtain the OAM information by obtaining the UAI via an access link between the UE and an NCR-Fwd of the NCR.

The NCR assistance information may include at least one of an alarm indicating an overheating status of the NCR, and an alarm indicating a change of location of the NCR.

The system may be configured to transmit the NCR assistance information by transmitting the NCR assistance information from an NCR-MT of the NCR to the base station via a control link.

The system may be configured to transmit the NCR assistance information by transmitting the NCR assistance information from an NCR-Fwd of the NCR to the base station via a backhaul link.

The system may be configured to transmit the NCR assistance information repeatedly at pre-determined time intervals.

According to an aspect of the disclosure, an NCR may be configured to obtain OAM information, generate NCR assistance information based on the OAM information and transmit, to a base station, the NCR assistance information, where a corrective action on the NCR may be performed based on the NCR assistance information.

The OAM information may include at least one of temperature information of the NCR, overheating information of the NCR, location information of the NCR, and UAI corresponding to a UE.

The NCR may include an NCR-Fwd and the NCR may be configured to obtain the OAM information by obtaining the UAI via an access link between the UE and the NCR-Fwd.

The NCR assistance information may include at least one of an alarm indicating an overheating status of the NCR, and an alarm indicating a change of location of the NCR.

The NCR may include an NCR-MT and the NCR may be configured to transmit the NCR assistance information by transmitting the NCR assistance information from the NCR-MT to the base station via a control link.

The NCR may include an NCR-Fwd and the NCR may be configured to transmit the NCR assistance information by transmitting the NCR assistance information from the NCR-Fwd to the base station via a backhaul link.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of network-controlled repeater (NCR) management, comprising:

obtaining, by an NCR, operations, administrations, and management (OAM) information;

generating, by the NCR, NCR assistance information based on the OAM information;

transmitting, by the NCR to a base station, the NCR assistance information; and performing, by the base station, a corrective action on the NCR based on the NCR assistance information in response to receiving the NCR assistance information.

2. The method of claim 1, wherein the OAM information comprises at least one of location information of the NCR, and user equipment (UE) assistance information (UAI) corresponding to a UE.

3. The method of claim 2, wherein obtaining the OAM information comprises obtaining the UAI via an access link between the UE and an NCR mobile forwarding function module (NCR-Fwd) of the NCR.

4. The method of claim 1, wherein the NCR assistance information comprises an alarm indicating a change of location of the NCR.

5. The method of claim 1, wherein the transmitting the NCR assistance information comprises:

transmitting the NCR assistance information from an NCR mobile termination function module (NCR-MT) of the NCR to the base station via a control link based on the OAM information being determined to be with respect to the NCR-MT; and transmitting the NCR assistance information from an NCR forwarding function module (NCR-Fwd) of the NCR to the base station via a backhaul link based on the OAM information being determined to be with respect to the NCR-Fwd and not the NCR-MT.

6. The method of claim 1, wherein the NCR assistance information comprises OAM information on the NCR and OAM information on a UE.

7. The method of claim 1, wherein the transmitting the NCR assistance information is performed repeatedly at pre-determined time intervals.

8. A system for network-controlled repeater (NCR) management, the system comprising:

a memory; and at least one processor configured to execute instructions in the memory to:

obtain, by an NCR, operations, administrations, and management (OAM) information;

generate, by the NCR, NCR assistance information based on the OAM information;

transmit, by the NCR to a base station, the NCR assistance information; and perform a corrective action on the NCR based on the NCR assistance information in response to receiving the NCR assistance information.

9. The system of claim 8, wherein the OAM information comprises at least one of location information of the NCR, and user equipment (UE) assistance information (UAI) corresponding to a UE.

10. The system of claim 9, wherein the at least one processor is configured to obtain the OAM information by obtaining the UAI via an access link between the UE and an NCR mobile forwarding function module (NCR-Fwd) of the NCR.

11. The system of claim 8, wherein the NCR assistance information comprises an alarm indicating a change of location of the NCR.

12. The system of claim 8, wherein the at least one processor is further configured to;

transmit the NCR assistance information by transmitting the NCR assistance information from an NCR mobile termination function module (NCR-MT) of the NCR to the base station via a control link based on the OAM information being determined to be with respect to the NCR-MT; and transmit the NCR assistance information from an NCR forwarding function module (NCR-Fwd) of the NCR to the base station via a backhaul link based on the OAM information being determined to be with respect to the NCR-Fwd and not the NCR-MT.

13. The system of claim 8, wherein corrective action is performed on the NCR by a UE.

14. The system of claim 8, wherein the system is further configured to transmit the NCR assistance information repeatedly at pre-determined time intervals.

15. A network-controlled repeater (NCR), comprising:

a memory; and a processor configured to execute instructions in the memory to:

obtain operations, administrations, and management (OAM) information;

generate NCR assistance information based on the OAM information; and transmit, to a base station, the NCR assistance information;

wherein a corrective action on the NCR is performed based on the NCR assistance information in response to receiving the NCR assistance information.

16. The NCR of claim 15, wherein the OAM information comprises at least one of location information of the NCR, and user equipment (UE) assistance information (UAI) corresponding to a UE.

17. The NCR of claim 16, wherein the NCR comprises an NCR mobile forwarding function module (NCR-Fwd), and wherein the at least one processor is configured to obtain the OAM information by obtaining the UAI via an access link between the UE and the NCR-Fwd.

18. The NCR of claim 15, wherein the NCR assistance information comprises an alarm indicating a change of location of the NCR.

19. The NCR of claim 15, wherein the NCR comprises an NCR mobile termination function module (NCR-MT) and an NCR mobile forwarding function module (NCR-Fwd), and wherein the at least one processor is further configured to transmit the NCR assistance information by transmitting the NCR assistance information from the NCR-MT to the base station via a control link based on the OAM information being determined to be with respect to the NCR-MT and not the NCR-Fwd, and by transmitting the NCR assistance information from the NCR-Fwd of the NCR to the base station via a backhaul link based on the OAM information being determined to be with respect to the NCR-Fwd and not the NCR-MT.

20. The NCR of claim 15, wherein corrective action is performed on the NCR by a UE.

* * * * *